United States Patent [19]
Cauthron et al.

[11] Patent Number: 4,535,726
[45] Date of Patent: * Aug. 20, 1985

[54] ANIMAL SPRAYING APPARATUS

[76] Inventors: Grover L. Cauthron, Rte. 1, Box 29, Fairview, Mo. 64842

[*] Notice: The portion of the term of this patent subsequent to Jul. 17, 2001 has been disclaimed.

[21] Appl. No.: 609,325

[22] Filed: May 11, 1984

Related U.S. Application Data

[63] Continuation-in-part of Ser. No. 473,053, Mar. 7, 1983, Pat. No. 4,459,942.

[51] Int. Cl.³ .............................................. A01K 29/00
[52] U.S. Cl. ................................................... 119/159
[58] Field of Search ................ 119/159, 158, 160, 156

[56] References Cited

U.S. PATENT DOCUMENTS

| | | | |
|---|---|---|---|
| 1,189,523 | 7/1916 | Armstrong | 119/159 |
| 1,604,303 | 10/1926 | Peck et al. | 119/159 |
| 4,334,504 | 6/1982 | Matthews | 119/159 |
| 4,459,942 | 7/1984 | Cauthron | 119/159 |

Primary Examiner—Jay N. Eskovitz
Attorney, Agent, or Firm—Kimmel, Crowell & Weaver

[57] ABSTRACT

A self-standing spraying apparatus is placed adjacent to an animal feed box or watering trough. The device includes two side and one upper spraying units for applying medicines and pesticides to the face and back of farm animals while drinking or feeding. A swingable barrier displaced forwardly by the head of the animal while drinking or feeding activates the upper spraying unit. Return movement of the barrier during retreat of the animal after drinking or feeding deactivates the upper spraying unit and activates the two side units to spray the two eye areas of the animal. Spray material is conserved and the apparatus is highly simplified.

5 Claims, 5 Drawing Figures

ANIMAL SPRAYING APPARATUS

CROSS-REFERENCE TO RELATED APPLICATION

This application is a continuation-in-part of prior copending application Ser. No. 473,053, filed March 7, 1983, for ANIMAL SPRAYING APPARATUS now U.S. Pat. No. 4,459,942.

BACKGROUND OF THE INVENTION

The general objective of the present invention is to improve and simplify the construction and mode of operation of the animal spraying apparatus disclosed in the prior-referenced application. In the prior application, a sprayer framework was placed on the top edges of an animal feed box or drinking trough. The framework included three sides and a bottom rendering it somewhat heavy and bulky. Two opposite side spray units were held on the framework and a single overhead spray unit was supported on a tubular arm rising from the rear of the framework. A normally level pivoted panel required lifting by the head of the animal during the seeking of food or water to activate the three sprayer units simultaneously. A rocker shaft associated with the swingable panel was connected to the three spray container release triggers by flexible elements activated by the rocker shaft.

In accordance with the present invention, the structure and its mode of operation has been greatly simplified, primarily by rendering the apparatus self-standing in a vertical mode in front of a watering trough or the like, and providing thereon a normally vertical swingable barrier which is displaced forwardly by an animal during feeding or drinking to activate only the upper spraying unit which is secured to the top of the upstanding framework. During the retreat of the animal from the watering trough and only at that time, the two side sprayer units are activated by the swinging barrier to apply spray to the opposite sides of the animal's face including the eye regions. The necessity for complex linkages and flexible elements in such linkages is eliminated in the present invention.

Other features and advantages of the invention will become apparent to those skilled in the art during the course of the following detailed description.

DETAILED DESCRIPTION

Figure 1:
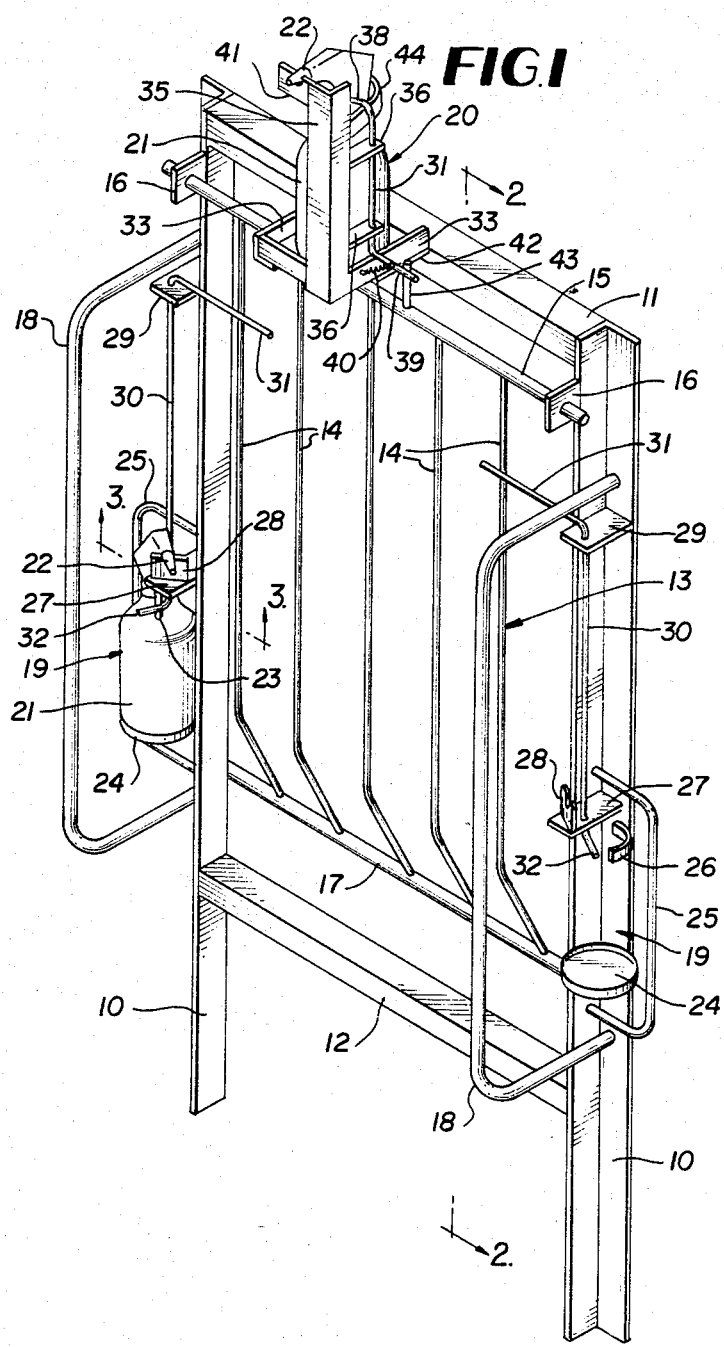
FIG. 1 is a perspective view of an animal spraying apparatus according to the present invention.

Referring to the drawings in detail, wherein like numerals designate like parts, an upstanding rigid frame for the apparatus comprises two spaced vertical angle iron posts 10 which are anchored at their bottoms in any suitable manner. The tops of the posts 10 are interconnected by a horizontal bar 11, and near their lower ends the posts are further interconnected by a horizontal transverse brace bar 12. The upstanding frame is placed closely adjacent to one side of a manger, feed box, or watering trough for farm animals, not shown in the drawings.

Figure 2:
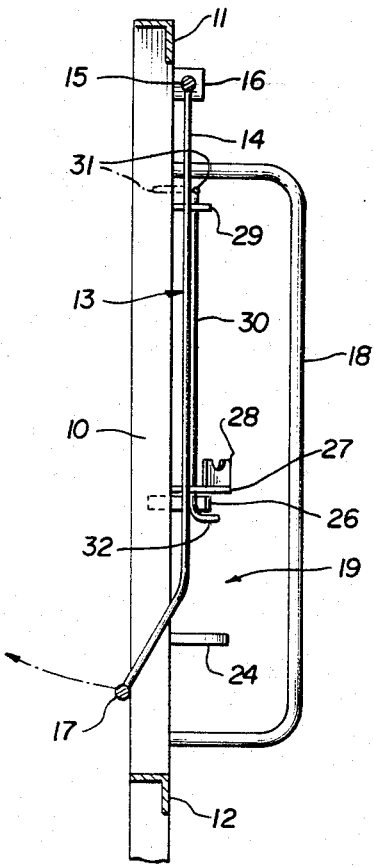
FIG. 2 is a fragmentary vertical section taken on line 2—2 of FIG. 1.
Figure 3:
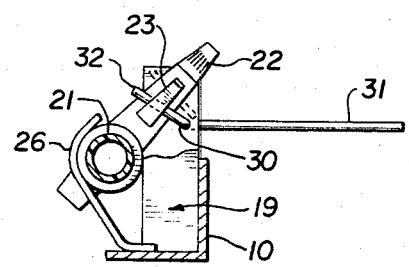
FIG. 3 is an enlarged fragmentary horizontal section taken on line 3—3 of FIG. 1.
Figure 4:
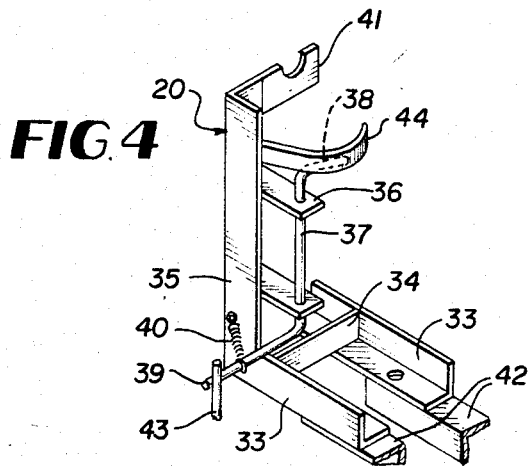
FIG. 4 is a perspective view of an upper spray container support and activator means.
Figure 5:
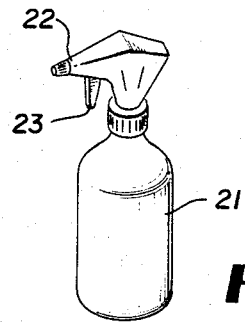
FIG. 5 is a perspective view of a spray container.

Swingably mounted on the upstanding frame and extending for the major part of the distance between the two horizontal bars 11 and 12 is a normally vertical barrier 13 consisting of a plurality of spaced parallel vertical rods 14 connected at their tops to a horizontal rocker shaft 15 whose ends are journaled in apertured bearings 16 fixed to the posts 10 near and below the bar 11 and projecting forwardly of the upstanding frame or opposite to the direction of approach of the drinking or feeding animal. The bottoms of the rods 14 are somewhat angled rearwardly or in the direction of the animal's approach, and are fixed to a bottom horizontal cross rod 17. As best shown in FIG. 2, the swinging barrier 13 is able to swing freely forwardly and rearwardly between the two posts 10. The directional arrow in FIG. 2 depicts the movement of the barrier 13 under influence of a feeding or drinking animal.

A pair of animal head guards 18 fixed rigidly to the frame posts 10 project forwardly of the upstanding frame on opposite sides of the swinging barrier 13. These guards provide general guidance and lateral restraint for a drinking or feeding animal.

The apparatus further comprises two opposite side lower spraying units 19 and a single laterally centered upper spraying unit 20. Each of the three spraying units utilizes a standard commercial container 21 of medicine, pesticide or the like having an adjustable spray nozzle 22 and a spray activating spring-biased trigger 23.

Each side spraying unit 19 includes a fixed support platform 24 for the container 21, and an outer side guard bar 25 for the protection of the side containers 21 in the apparatus. Above each container platform 24 and fixed to the adjacent post 10 is a container neck rest or stabilizer 26 which is arcuate. Immediately above each neck rest 26 is a small horizontal plate 27 carrying an upstanding rest 28 for the adjustable spray nozzle 22 or knob.

At an elevation above each plate 27 a similar horizontal plate 29 is fixed to each post 10 in overlying relationship to the plate 27. The pairs of plates 27 and 29 are apertured to receive rotatably vertical axis shafts 30 each having a top horizontally swingable crank arm 31 projecting across one of the vertical rods 14 of swingable barrier 13 on the forward side of such barrier. Similarly, each shaft 30 carries a lower end crank arm 32 substantially at right angles thereto and disposed beneath the container neck rest 26. The lower crank arms 32 are held in engagement with the triggers 23 of spray containers 21 of the two side spraying units 19 when the barrier 13 is hanging vertically in its normal position. In such normal position, the upper crank arms 31 are being engaged by the rods 14 but are not being rotated to activate the two side spraying units.

The single upper spraying unit 20 has its container 21 resting on a support consisting of a pair of short spaced angle bars 33 rigidly connected by a cross bar 34 serving as a locator element for the container 21 seated on the two bars 33. The container 21 is held between the bar 34 and the top bar 11 of the upstanding frame during use.

A corner angle bar post 35 rises from one of the bars 33 and is rigid therewith. The corner post 35 carries a pair of vertically spaced superposed apertured plates 36 forming bearings for a short vertical rotational shaft 37 having top and bottom crank arms 38 and 39. The upper crank arm 38 extends across the trigger 23 of upper container 21 and is biased lightly into contact with such trigger by a tension spring 40 connected between the lower crank arm 39 and the adjacent bar 33. A rest 41 for the spray nozzle 22 of upper container 21 is fixed on the top end of corner post 35. The rests 28 and 41 prevent rotation of the spray containers 21 during the use of the apparatus. The two bars 33 forming the support for the upper spray container 21 are suitably fixed to the top frame bar 11 as by attaching them to a pair of underlying bars 42 attached to and projecting forwardly of the top frame bar 11.

A crank pin 43 fixed to the rocker shaft 15 near its center and rising therefrom crosses and engages the lower crank arm 39 of rotational shaft 37, as shown in the drawings. A curved neck rest 44 for the container 21 of upper spraying unit 20 is also provided, and fixed to the corner post 35.

OPERATION

Before being approached by an animal seeking water or food, the swinging barrier 13 hangs vertically and maintains engagement with the upper crank arms 31. The lower crank arms 32 are held in light contact with the spray release triggers 23 of lower containers 21 but the lower side sprays are not released at this time.

Similarly, with the barrier 13 hanging freely, the crank pin 43 engages but does not turn the lower crank arm 39. The spring 40 maintains the upper crank arm 38 in light engagement with the trigger 23 of upper spray container 21.

When an animal approaches the feed or watering trough, not shown, its head enters between the two guards 18 and engages the barrier 13 pushing it rearwardly in the direction of the arrow, FIG. 2. This enables the animal to reach the food or water in the box or trough immediately behind the spraying apparatus.

As the barrier 13 is thus displaced, the crank pin 43 acting on crank arm 39 turns the shaft 37 and crank arm 38 in the direction to force the crank arm 38 against the spray trigger 23, releasing spray from the upper unit 20 onto the back of the animal while it is drinking or feeding. The spray from the upper unit 20 will be applied to the back of the animal as long as the barrier 13 is displaced by the animal. At this time, the barrier rods 14 move away from the crank arms 31, so that the side spraying units 19 are inactive.

As the animal backs off from the feed box or drinking trough, the barrier 13 will swing downwardly to and somewhat beyond its normal vertical position. This will deactivate the upper spraying unit 20 because the crank pin 43 will move away from crank arm 39. However, at this time, the swinging barrier rods 14 will swing the crank arms 31 forwardly and the shafts 30 will rotate in the direction causing the lower crank arms 32 to act on the triggers 23 of the two lower containers 21 to release their sprays onto the opposite sides of the retreating animal's face including the areas of the eyes. It may be seen that the nozzle 22 of the lower spray units 19 are aimed toward the sides of the animal's head, while the nozzle 22 of upper unit 20 is aimed over the back of the animal.

The barrier 13 will return automatically by gravity to its vertically hanging position shown in the drawings and, in so doing, the triggers 23 of lower containers 21 are released and the two side spraying units 19 are automatically turned off. All three of the spraying units are now off until the next animal displaces the swinging barrier 13 to first turn on the top spray unit 20 and later turn off this unit while turning on the two side units 19 during the retreat of the animal from the apparatus. Expensive spray material is conversed by not having the three sprays activated during the entire time of feeding or drinking.

It can also be seen that the construction of the apparatus is much simpler and more compact than that in the prior-referenced patent application.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An animal spraying apparatus comprising an upright support frame adapted to be positioned adjacent to one side of an animal feed box or watering trough, a free-hanging normally substantially vertical barrier on the support frame and being connected therewith through an upper horizontal axis rocker shaft whereby the barrier is vertically swingable forwardly and rearwardly on the axis of said rocker shaft, an upper center animal spraying unit on the support frame above said barrier and adapted to apply spray to the back of a drinking or feeding animal, two laterally spaced opposing side spraying units on the support frame on opposite sides of the barrier and near the lower end of the barrier and at an elevation substantially below the elevation of the upper spraying unit, the two side spraying units being adapted to apply sprays simultaneously to the opposite sides of the face of a drinking or feeding animal subsequent to the application of spray by the upper spraying unit and while the drinking or feeding animal is retreating from the apparatus, said upper and two side spraying units having individual vertical axis rotary actuating elements including parts in the path of movement of parts on said barrier, whereby forward displacement of the barrier caused by the approach of a drinking or feeding animal activates the upper spraying unit and rearward displacement of the barrier by gravity during retreat of the drinking or feeding animal deactivates the upper spraying unit and activates the two side spraying units.

2. An animal spraying apparatus as defined in claim 1, and said parts of the rotary actuating elements comprising horizontal crank arms, and said parts on said barrier comprising an upright pin on said rocker shaft and a pair of vertical rods on the barrier near its opposite sides.

3. An animal spraying apparatus as defined in claim 1, and said upper and two side spraying units each including a support on said frame, a spray container having a spray release trigger and spray nozzle on the support, and said individual vertical axis rotary actuating elements including additional parts which engage and operate said spray release triggers during rotation of said actuating elements.

4. An animal spraying apparatus comprising a support frame adapted for placement near one side of an animal feed box or watering trough, a free-hanging gravity-responsive vertically swingable barrier on and across the support frame, an upper center animal spraying unit on the top of the support frame above said barrier for applying spray to the back of a drinking or feeding animal, two laterally spaced opposite side spraying units on the sides of the support frame for applying sprays simultaneously to the opposite sides of the face of an animal, said upper center and two opposite side spraying units each having independently operable rotary actuating elements in the path of movement of the vertically swingable barrier, whereby forward displacement of the barrier by an animal first activates the upper center spraying unit and subsequent rearward displacement of the barrier by gravity activates the two opposite side spraying units while deactivating the upper center spraying unit.

5. An animal spraying apparatus as defined in claim 4, and said rotary actuating elements including crank arms and said swingable barrier includes parts which engage and displace the crank arms during swinging movement of the barrier.

* * * * *